United States Patent
Greenland et al.

(10) Patent No.: US 8,441,551 B2
(45) Date of Patent: May 14, 2013

(54) FLICKER DETECTION CIRCUIT FOR IMAGING SENSORS THAT EMPLOY ROLLING SHUTTERS

(75) Inventors: Graham C. H. Greenland, Toronto (CA); Milivoje Aleksic, San Diego, CA (US); Sergio Goma, San Diego, CA (US)

(73) Assignee: ATI Technologies ULC, Markham, Ontario (CA)

( * ) Notice: Subject to any disclaimer, the term of this patent is extended or adjusted under 35 U.S.C. 154(b) by 745 days.

(21) Appl. No.: 12/616,617

(22) Filed: Nov. 11, 2009

(65) Prior Publication Data

US 2010/0123810 A1 May 20, 2010

Related U.S. Application Data

(60) Provisional application No. 61/114,748, filed on Nov. 14, 2008.

(51) Int. Cl.
*H04N 9/73* (2006.01)
*H04N 3/14* (2006.01)

(52) U.S. Cl.
USPC .................. 348/228.1; 348/296; 348/364

(58) Field of Classification Search ............... 348/226.1, 348/228.1
See application file for complete search history.

(56) References Cited

U.S. PATENT DOCUMENTS

| | | | | |
|---|---|---|---|---|
| 5,384,595 A | * | 1/1995 | Sakaguchi | 348/208.99 |
| 6,710,818 B1 | * | 3/2004 | Kasahara et al. | 348/607 |
| 7,142,234 B2 | | 11/2006 | Kaplinsky et al. | |
| 7,164,113 B2 | * | 1/2007 | Inokuma et al. | 250/208.1 |
| 7,298,401 B2 | | 11/2007 | Baer | 348/226.1 |
| 7,397,503 B2 | | 7/2008 | Baer et al. | |
| 7,639,285 B2 | * | 12/2009 | Nomura et al. | 348/228.1 |
| 7,911,505 B2 | * | 3/2011 | Pillman et al. | 348/226.1 |
| 7,965,323 B2 | * | 6/2011 | Lee et al. | 348/226.1 |
| 8,072,506 B2 | * | 12/2011 | Jang et al. | 348/226.1 |
| 2004/0001153 A1 | * | 1/2004 | Kikukawa et al. | 348/226.1 |
| 2006/0221205 A1 | | 10/2006 | Nakajima et al. | |
| 2007/0182831 A1 | * | 8/2007 | Katoh et al. | 348/226.1 |
| 2008/0024633 A1 | * | 1/2008 | Hofer | 348/296 |
| 2012/0154629 A1 | * | 6/2012 | Horiuchi | 348/226.1 |

OTHER PUBLICATIONS

International Search Report for International Application No. PCT/CA2009/001652, Mar. 1, 2010, 3 pp.

(Continued)

*Primary Examiner* — Ngoc-Yen Vu
(74) *Attorney, Agent, or Firm* — Faegre Baker Daniels LLP

(57) ABSTRACT

Circuitry, apparatus and methods provide flicker detection and improved image generation for digital cameras that employ image sensors. In one example, circuitry and methods are operative to compare a first captured frame with a second captured frame that may be, for example, sequential and consecutive or non-consecutive if desired, to determine misalignment of scene content between the frames. A realigned second frame is produced by realigning the second frame with the first frame if the frames are determined to be misaligned. Luminance data from the realigned second frame and luminance data from the pixels of the first frame are used to determine if an undesired flicker condition exists. If an undesired flicker condition is detected, exposure time control information is generated for output to the imaging sensor that captured the frame, to reduce flicker. This operation may be done, for example, during a preview mode for a digital camera, or may be performed at any other suitable time.

18 Claims, 11 Drawing Sheets

OTHER PUBLICATIONS

Written Opinion for International Application No. PCT/CA2009/001652, Mar. 1, 4 pp.
Poplin, D., "An Automatic Flicker Detection Method for Embedded Camera Systems"; IEEE Transactions on Consumer Electronics; pp. 308-311; 2006.
Tajbakhsh, T., "Illumination Flicker Frequency Classification in Rolling Shutter Camera Systems"; Proceedings of IASTED 2007, Signal and Image Processing; pp. 288-293; 2007.
Liang, C.K., "Analysis and Compensation of Rolling Shutter Effect"; IEEE Transactions on Image Processing; pp. 1323-1330; 2008.

\* cited by examiner

FLICKER DETECTION CIRCUIT FOR IMAGING SENSORS THAT EMPLOY ROLLING SHUTTERS

CROSS-REFERENCE TO RELATED APPLICATION

The present patent application claims priority from and the benefit of U.S. Provisional Patent Application No. 61/114,748 filed Nov. 14, 2008, entitled FLICKER DETECTION CIRCUIT FOR IMAGING SENSORS THAT EMPLOY ROLLING SHUTTERS, which is hereby incorporated herein by reference in its entirety.

FIELD OF THE DISCLOSURE

The disclosure relates generally to flicker detection circuits and devices employing the same.

BACKGROUND OF THE DISCLOSURE

CMOS imaging sensors are commonplace in many handheld devices. One of the challenges of this technology is the image flicker that is caused by the interaction of fluorescent lighting and the sensor's electronic rolling shutter. Non stationary sequences pose a challenging problem to multi frame processes. To address these limitations a new process is proposed to improve flicker detection performance by using frame alignment. This method significantly improves the performance in handshake and vertical panning conditions.

Imaging devices are increasingly commonplace in many digital handheld devices. Many of these devices use CMOS imaging sensors with an electronic rolling shutter. The rolling shutter unlike a mechanical shutter requires that different parts of the image are exposed over different time intervals. Specifically, each successive row of the image is offset in time. One consequence of this approach is that spatial flicker is generated in the image under fluorescent lighting since each row is exposed to a different amount of total illuminance. Robust detection of this flicker is essential in order to properly configure the camera to remove the artifacts. A real time imaging system places additional constraints on flicker detection. Practical imaging systems need to operate at 15 or 30 fps which greatly reduces the spatial flicker frequencies in the image making the detection process more challenging.

Various approaches to this problem have been proposed. Baer et. al. proposed modifying the sensor architecture to read out each pixels twice in opposite orders and sum the result to reduce the appearance of flicker as described in R. L. Baer, R. Kakarala, "Systems and methods for reducing artifacts caused by illuminant flicker," U.S. Pat. No. 7,397,503. Other methods use the captured image or image sequence to detect flicker. Many such methods rely on sequential frames in order to detect flicker or described in D. Poplin, "An Automatic Flicker Detection Method for Embedded Camera Systems," IEEE Transactions on Consumer Electronics, 52(2), 308-311 (2006); T. Tajbakhsh, R. R. Grigat, "Illumination Flicker Frequency Classification in Rolling Shutter Camera Systems," Proceedings of IASTED 2007, Signal and Image Processing, 288-293 (2007); and M. Kaplinsky, I. Subbotin, "Method for mismatch detection between the frequency of illumination source and the duration of optical integration time for imager with rolling shutter," U.S. Pat. No. 7,142,234. In these works the scene is always assumed to be stationary which in practice is rarely the case.

It has been found that the illuminance from a fluorescent light source varies in time due to the alternating current supply in the power source. Depending on the geographical location the supply is either 60 or 50 Hz. The power transferred to the light source oscillates at twice the supply frequency resulting in an illuminance that varies at either 120 or 100 Hz. The illuminance from the light source is modeled by the following function:

$$s(t) = A + B\sin^2\left(\frac{2\pi}{2 \cdot T}t\right) = A + \frac{B}{2} - \frac{B\cos\left(\frac{2\pi}{T}t\right)}{2} \tag{1}$$

Where A is the DC illuminance at the zero crossing of the voltage in the power source when no power is being transferred to the light source. The DC portion of the illuminance does not contain any flicker so for simplicity A is set to zero. B is a scalar that determines the magnitude of flicker in a given light source and is equal to the illuminance when the voltage is at a maximum minus the constant A. Both A and B are constants that will vary from light source to light source. T is the flicker period. Flicker at this frequency is not perceived by human vision however a rolling shutter CMOS sensor can pick up this variation.

Consider FIG. 1 which plots Equation 1 for F=120 Hz and A=0, B=1 for simplicity. A typical electronic rolling shutter is shown below it. In a rolling shutter, each row starts and finishes integrating at different moments in time. The difference between any two rows is given by $\Delta r$. The signal in row 1 is proportional to the area under the curve over its integration time shown with the descending hatching. Accordingly, the signal in row n is proportional to the area shown with rising hatching. The cross hatched area corresponds to the time over which both row 1 and row n are integrating together. This figure illustrates that the total area for row 1, and thus the signal for row 1, is greater than the area for row n. This relative difference in exposure manifests itself as dark to light banding over the image. Not all integration times will produce flicker. If the integration time is set in multiples of the flicker frequency then the area under the curve is constant irrespective of the offset $\Delta r$. In such cases no flicker is present. Integration time is therefore expressed by the following equation:

$$t_i = N \cdot T + \Delta t \tag{2}$$

Where N is the number of full flicker periods and $\Delta t$ is difference in time between N flicker periods and the actual integration time.

The sensor response of the each row in the sensor is proportional to the illuminance that each row receives over the integration time. It is possible to derive the sensor response to the flicker illuminance as a function of the offset in row start time $\Delta r$, and integration time $t_i$.

$$R_n \propto \int_{t_{sn}}^{t_{en}} s(t)\,dt = \int_{\Delta r}^{N \cdot T + \Delta t + \Delta r} s(t)\,dt = \tag{3}$$

$$\int_{\Delta r}^{T} s(t)\,dt + \int_{T}^{N \cdot T} s(t)\,dt + \int_{N \cdot T}^{N \cdot T + \Delta r} s(t)\,dt + \int_{N \cdot T + \Delta r}^{N \cdot T + \Delta r + \Delta t} s(t)\,dt$$

$$= N \int_{0}^{T} s(t)\,dt + \int_{\Delta r}^{\Delta r + \Delta t} s(t)\,dt \tag{4}$$

Substituting Eqn. 1 with A=0 into Eqn. 4 gives the following:

$$= \frac{B}{2}\left[N\int_0^T 1 - \cos\left(\frac{2\pi}{T}t\right)dt + \int_{\Delta r}^{\Delta r+\Delta t} 1 - \cos\left(\frac{2\pi}{T}t\right)dt\right] \quad (5)$$

$$= \frac{B}{2}\left[NT + \Delta t + \frac{T}{2\pi}\left[\sin\left(\frac{2\pi}{T}\Delta r\right) - \sin\left(\frac{2\pi}{T}\Delta r + \frac{2\pi}{T}\Delta t\right)\right]\right]$$

This equation describes the response of a row offset by $\Delta r$. This equation can be generalized to describe the response of row n by using the following relation.

$$\Delta r = n\Delta rd \quad (6)$$

Where $\Delta rd$ is the row delay between two adjacent rows. The following equation of row response as a function of row number results from substituting Eqn. 6 into Eqn. 5.

$$R(n) = B\left[NT + \Delta t + \frac{T}{2\pi}\left[\sin\left(\frac{2\pi}{T}n\Delta rd\right) - \sin\left(\frac{2\pi}{T}n\Delta rd + \frac{2\pi}{T}\Delta t\right)\right]\right] = \quad (7)$$

$$B\left[NT + \Delta t - \frac{T}{\pi}\left[\cos\left(\frac{2\pi}{T}n\Delta rd\right) \cdot \sin\left(\frac{\pi}{T}\Delta t\right)\right]\right]$$

In the final model, the response contains a linear term $B(NT+\Delta t)$ which is determined solely by the integration time and is independent of the row. From that a modulated harmonic term is subtracted. In this term a cosine harmonic is a function of row number and the row delay. This harmonic is modulated by a sinusoid whose frequency depends on $\Delta t$. The effect of this modulation is clear. When the integration time is a multiple of the flicker frequency $\Delta t=0$ and Eqn. 7 reduces to the following.

$$R = BNT \quad (8)$$

As expected the response no longer varies between rows and is only dependant on the length of integration time. In such a case, no flicker will be present in the image. It is also important to note that the modulation factor will be maximum when $\Delta t=T/2$. As will be shown, the magnitude of the flicker signal is generally weak so maximizing the amplitude of the signal will aid detection.

The row delay $\Delta rd$ will affect the frequency of the flicker in the image. FIG. 2 plots the theoretical response at three different row delays. As the delay between adjacent rows increases, the frequency of the flicker seen in the image also increases. The relationship between the flicker period of the light source and the spatial period of the flicker in the image is:

$$T_{spatial} = \frac{T_{flicker}}{\Delta rd} \quad (9)$$

One of the significant challenges of a real time flicker detection system is the low spatial frequency of the flicker in an image. At 30 fps the frame time is only 33.33 μs which means there are only 3.3 periods at 50 Hz and 4 periods at 60 Hz.

The total integration time also affects the signal strength of flicker in the image. The flicker ratio Fratio is defined as the response from the row with the maximum signal divided by the response from the row with the minimum signal.

$$F_{ratio} = \text{Max}\,[R(n)]/\text{Min}\,[R(n)] \quad (10)$$

FIG. 3 plots this ratio as a function of total integration time for a 60 Hz flicker frequency. The ratio moves towards unity at multiples of the flicker frequency and with peaks when $\Delta t=T/2$. However, the peaks get smaller as N increases. The flicker ratio and therefore the flicker in the image increases towards infinity for integration times less than T.

Previous works have demonstrated that scene content in the image can be reduced significantly by subtracting successive frames such as D. Poplin, "An Automatic Flicker Detection Method for Embedded Camera Systems," IEEE Transactions on Consumer Electronics, 52(2), 308-311 (2006); and M. Kaplinsky, I. Subbotin, "Method for mismatch detection between the frequency of illumination source and the duration of optical integration time for imager with rolling shutter," U.S. Pat. No. 7,142,234. The results were obtained using static scenes and did not consider more practical cases were the scene content is dynamic. Since the magnitude of the flicker signal can be quite small relative to the signal of the underlying scene even a small misalignment will cause signals from the scene to remain after subtraction. Previous works have dealt with the problem of frame to frame alignment to reduce shearing effects of the rolling shutter as set forth in C. K. Liang, L. W. Chang, H. H. Chen, "Analysis and Compensation of Rolling Shutter Effect," IEEE Transactions on Image Processing, 17(8), 1323-1330 (2008). However, the above works do not provide a suitable flicker detection and correction scheme for imaging sensor that employ a rolling shutter configuration.

BRIEF DESCRIPTION OF THE DRAWINGS

The disclosure will be more readily understood in view of the following description when accompanied by the below figures and wherein like reference numerals represent like elements, wherein.

DETAILED DESCRIPTION OF THE PREFERRED EMBODIMENTS

Figure 1:
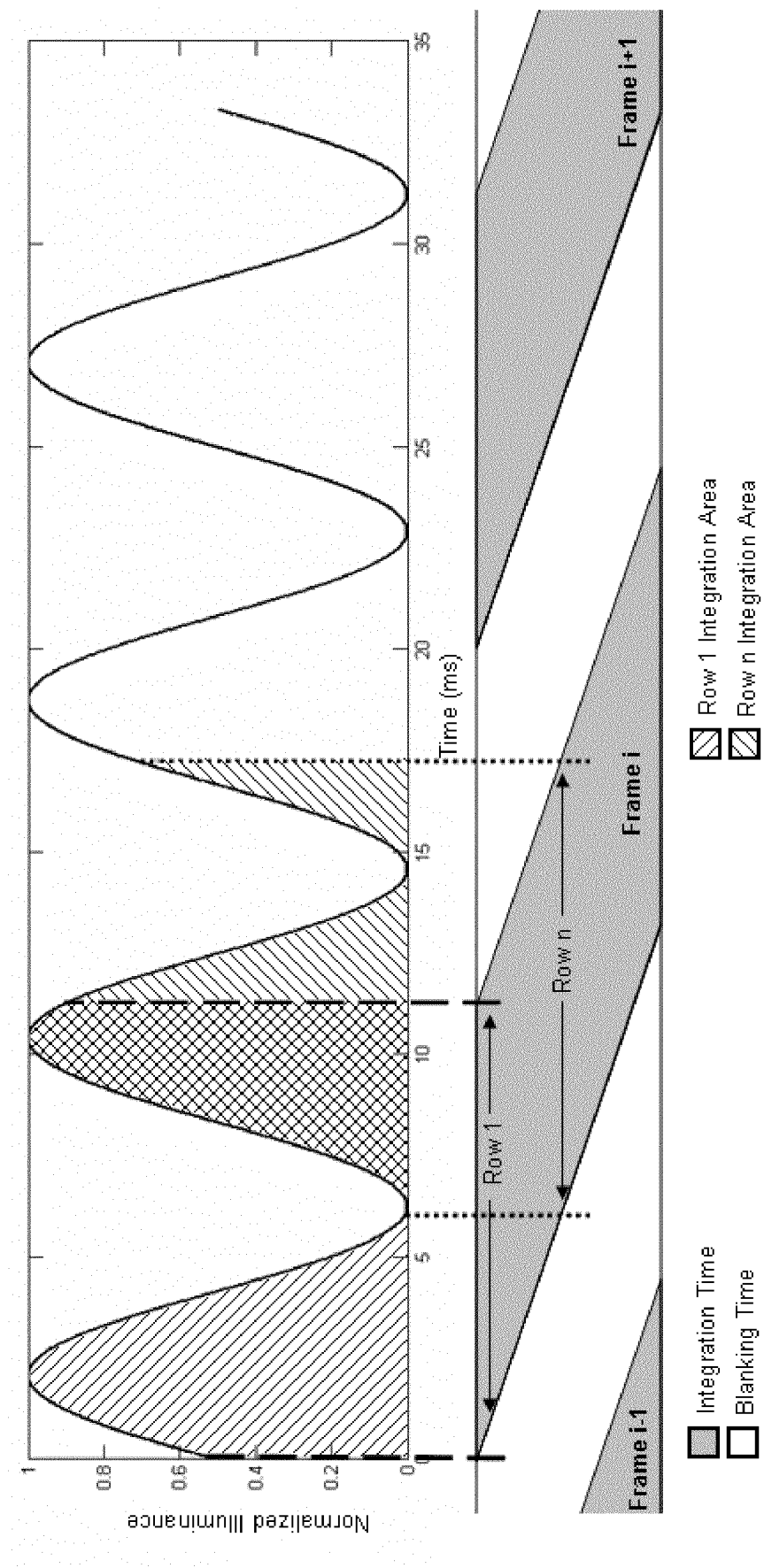
FIG. 1 is an example of an illuminance model of a 60 Hz fluorescent light source, A=0 B=1 and the effect of an electronic rolling shutter.
Figure 2:
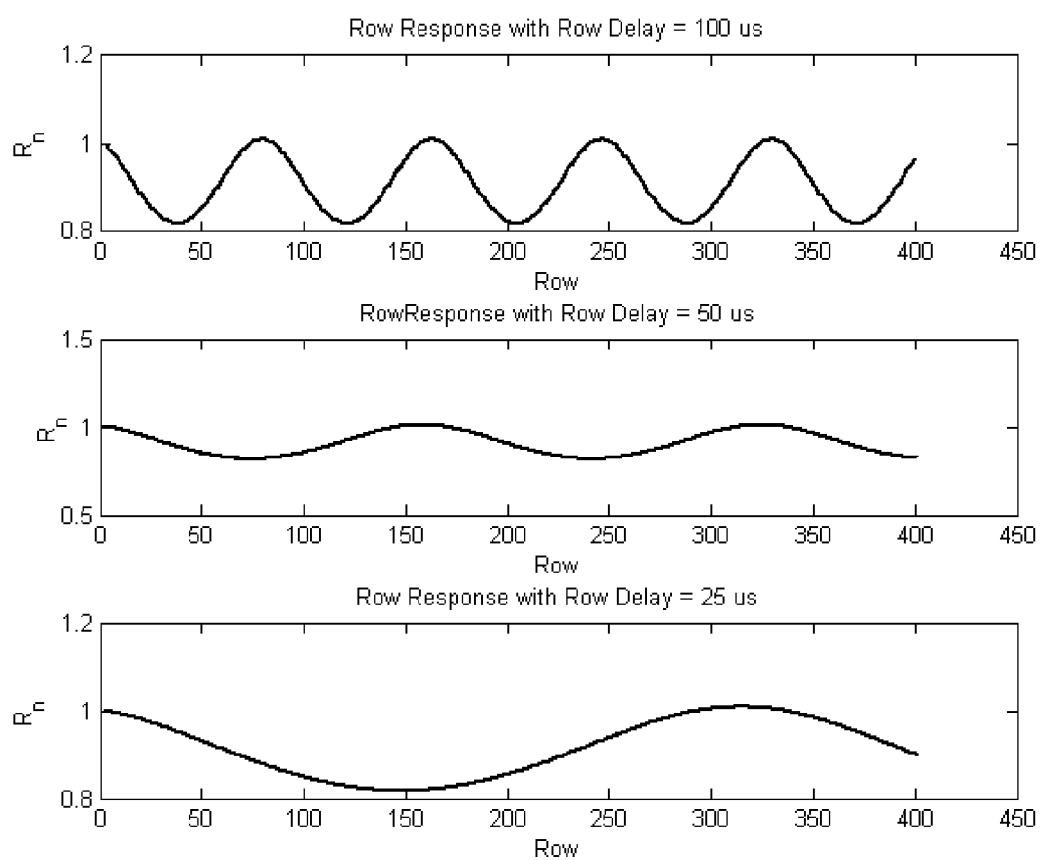
FIG. 2 is an example of an effect of row delay on image flicker frequency.
Figure 3:
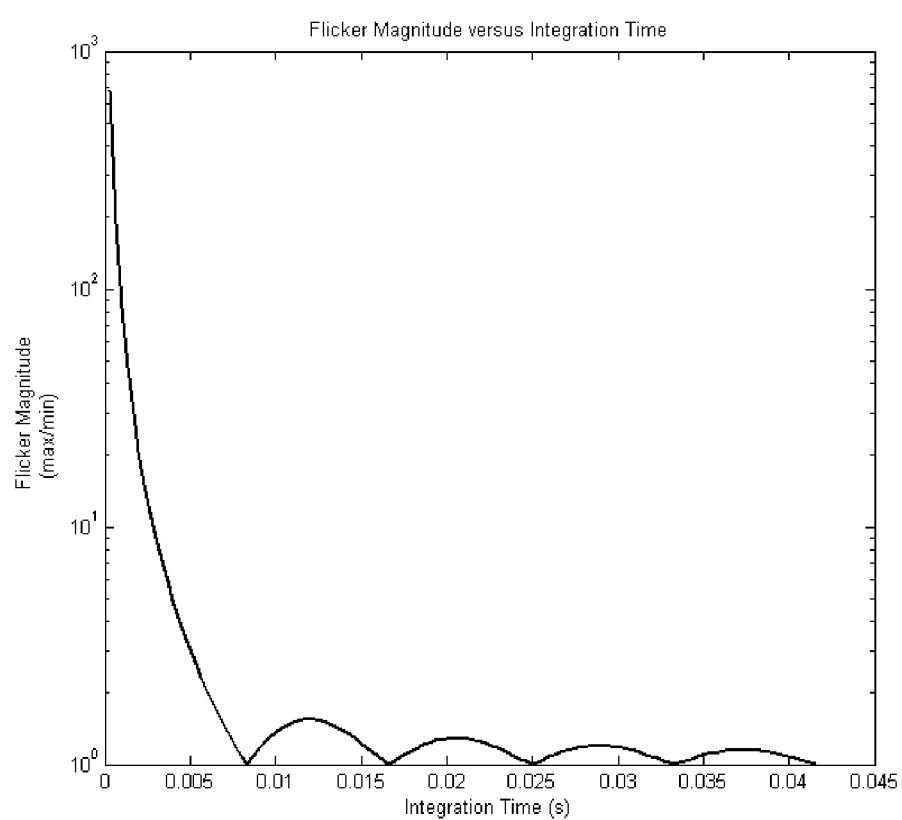
FIG. 3 is an example of an effect of integration time on flicker magnitude.

Briefly, circuitry, apparatus and methods provide flicker detection and improved image generation for digital cameras that employ image sensors. In one example, circuitry and methods are operative to compare a first captured frame with a second captured frame that may be, for example, sequential and consecutive or non-consecutive if desired, to determine misalignment of scene content between the frames. A realigned second frame is produced by realigning the second frame with the first frame if the frames are determined to be misaligned. Luminance data from the realigned second frame and luminance data from the pixels of the first frame are used to determine if an undesired flicker condition exists. If an undesired flicker condition is detected, exposure time control information is generated for output to the imaging sensor that captured the frame, to reduce flicker. This operation may be done, for example, during a preview mode for a digital camera, or may be performed at any other suitable time.

In one example, an apparatus, such as a smart phone, cell phone, or any other suitable apparatus employing a digital camera with an imaging sensor, such as a CMOS imaging sensor, with a rolling shutter configuration employs circuitry, that is operative to compare a first frame captured by the CMOS imaging sensor with a second frame captured by the CMOS imaging sensor to determine misalignment of scene content between the captured frames. The circuitry is operative to produce a realigned second frame by moving the pixels of the second frame to reposition them to be in a same position with respect to the first frame if they are determined to be misaligned. The luminance data from the realigned second frame (from the pixels thereof) and luminance data from the first frame are used to determine if an undesired flicker condition exists. If an undesired flicker condition exists, the exposure time of the CMOS imaging sensor is adjusted to reduce flicker. The control logic may include an integrated circuit that includes circuitry that is operative to perform the operations described above, may include discrete logic, may include state machines structured to perform the operations, may include one or more digital signal processors (DSPs), may include one or more microprocessors that execute executable instructions that are stored in computer readable memory such that when executed, cause the microprocessor to operate as described herein. Any other suitable structure may also be employed.

Among other advantages, the disclosed circuitry, apparatus, and method provide a multi-frame approach that uses alignment between frames to improve flicker detection performance. A multi-frame approach that uses alignment between frames is advantageous because, inter alia, it permits robust flicker detection capable of detecting flicker in both stationary and non-stationary image sequences. This provides for improved flicker detection in, for example, handshake, vertical panning, and horizontal panning imaging scenarios. Successful flicker detection is essential for reducing the undesirable effects caused by the interaction between fluorescent lighting and a CMOS imaging sensor's rolling shutter. Other advantages will be recognized by those of ordinary skill in the art.

Figure 4:
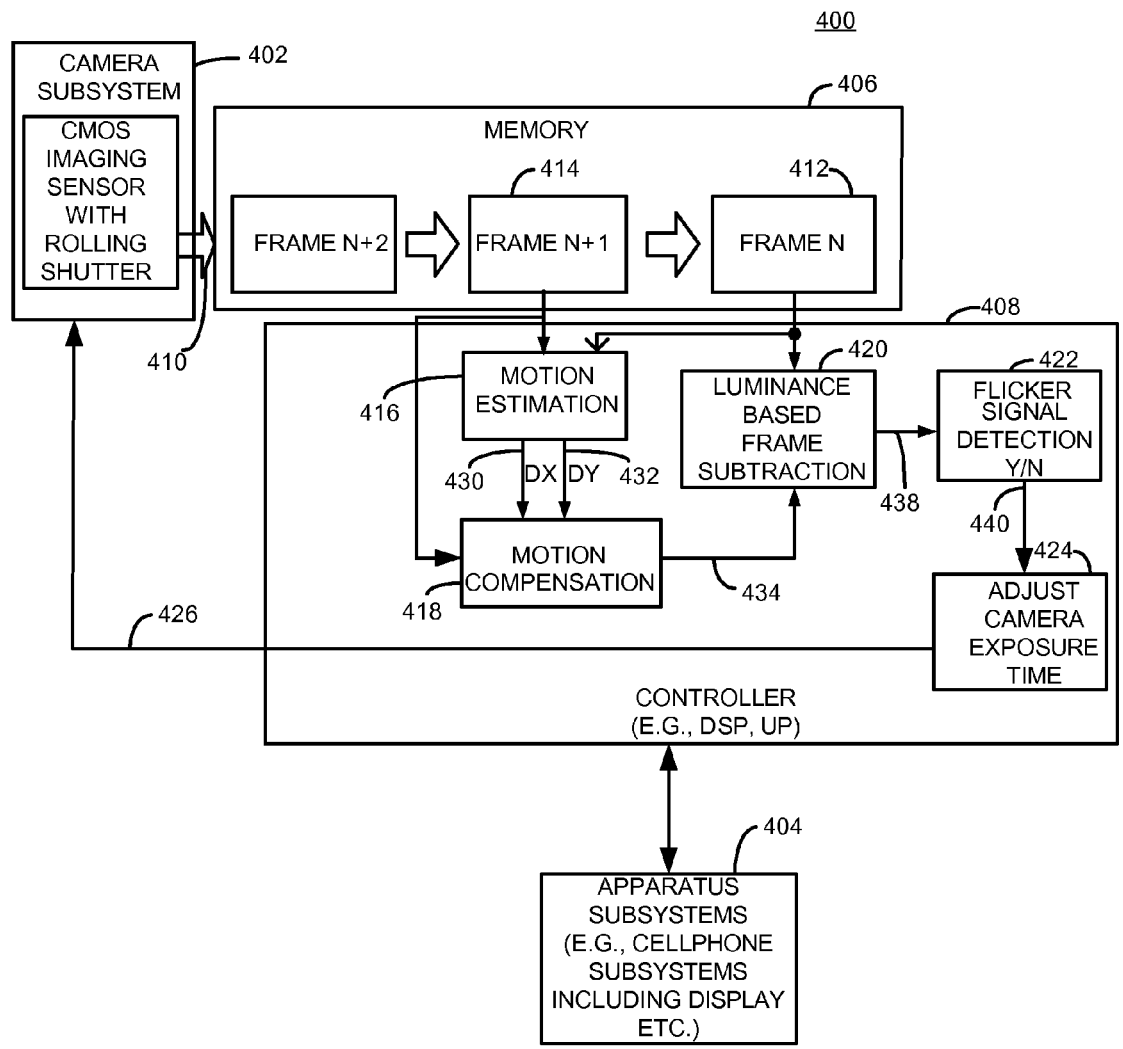
FIG. 4 is a block diagram illustrating one example of an apparatus in accordance with one embodiment of the disclosure.

FIG. 4 is a block diagram illustrating one example of an apparatus 400 which for purposes of illustration only, will be described as being a cell phone or smart phone that includes a digital camera subsystem 402, requisite apparatus subsystems 404 such as requisite cell phone subsystems including wireless subsystems, display, keypads or any other subsystems as known in the art. In addition, the apparatus 400 includes memory 406 which may be, for example, FIFO memory, RAM, such as frame buffer memory, or any other suitable type of memory. The apparatus 400 is also shown to include circuitry 408 which may be part of a larger integrated circuit, may be made as a microprocessor that executes executable instructions (as noted above) that are stored in memory (not shown) such as RAM, ROM, distributed memory in Internet servers, or any other suitable memory that stores executable instructions thereon, that when executed cause the microprocessor to perform the operations set forth.

The camera subsystem 402 in this example is shown as being a CMOS imaging sensor with a rolling shutter configuration. However, any imaging sensor with rolling shutter operation may also benefit from the operations described herein. The camera subsystem 402 for example, during a preview mode, captures and provides a stream of captured frames 410 which are temporarily stored in memory 406. As shown in this example, frame N 412 is a current frame, frame N+1 is a next captured frame in time and so on. The circuitry 408 (also referred to as controller) includes motion estimation circuitry 416, motion compensation circuitry 418, luminance based frame subtraction circuitry 420, flicker signal detection circuitry 422, and camera exposure time control information generation circuitry 424.

The motion estimation circuitry 416 receives both a current frame of pixels and a subsequent and in this example, sequential frame 414 and determines if motion is detected in the frame. For example, pixels at the same positions from each of the frames are compared to determine whether the values have changed and determines, for example, if the image has shifted to the left or right by one row or column of pixels or multiple columns of pixels using any suitable technique. One example of misalignment detection is described further below. As shown, the motion estimation logic compares the current frame 412 to the next frame 414 for example, on a pixel-by-pixel basis, block-by-block basis or any other suitable basis, to determine misalignment of the scene content between the frames. The motion estimation circuitry 416 provides alignment offset information 430 representing the amount of offset in the x direction and also in this example, offset in the y direction shown as misalignment or offset information 432. It will be recognized, however, that merely detecting a change in either of the x or y direction may also be employed. The offset information 430 and 432 is received by the motion compensation circuitry 418 along with the second frame 414 so that the second frame 414 can be realigned (the scene content) to match the corresponding locations of the first frame 412. The result is the production of a realigned second frame 434 which is an alignment of the second frame 414 with the first frame if a misalignment is determined based on the offset information 430 and 432.

The luminance based frame subtraction circuitry 420 determines the luminance information on a pixel-by-pixel basis for the current frame 412 and the realigned second frame 424 and uses the luminance data from both sets of frames (subtracts luminance data corresponding pixel locations from each of the realigned second frame and first frame), and produces data 438 representing the flicker image (an aligned frame difference). The flicker signal detection circuitry 422 evaluates the energy level of the data 438 to determine if flicker has been detected. The flicker detection signal 440 is provided to the camera exposure adjust logic 424 which then sends camera exposure time control information 426 to the camera subsystem 402 so that the camera subsystem changes the camera exposure time to reduce the flicker.

Figure 5:
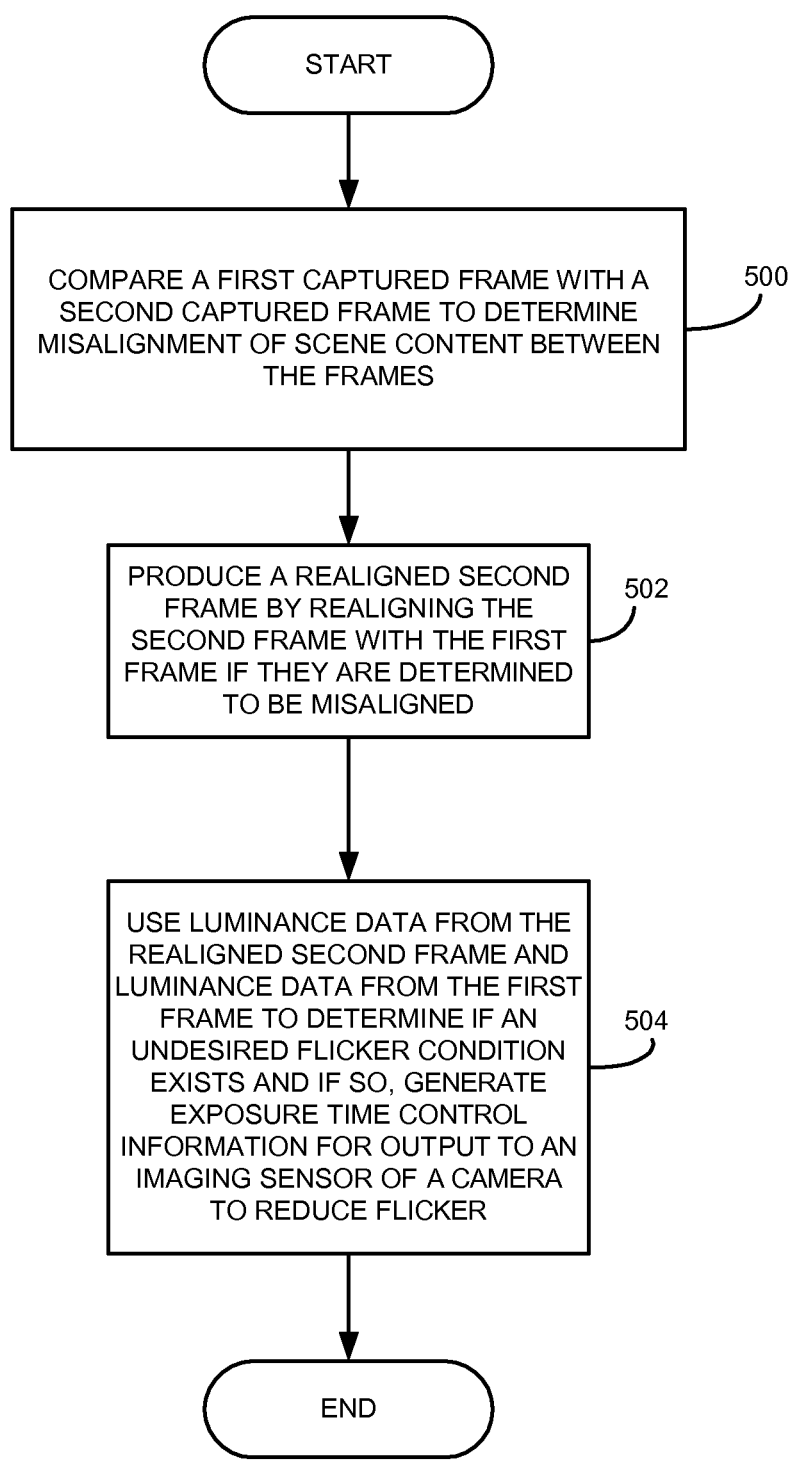
FIG. 5 is a flowchart illustrating one example of a method carried out by an electronic apparatus in accordance with one example of the disclosure.

Referring also to FIG. 5, a method that may be carried out, for example, by the circuitry 408, shown in block 500 compares a first captured frame 412 with a second captured frame 414 to determine misalignment of scene content between the frames using, for example, the motion estimation circuitry 416. As shown in block 502, the method includes producing a realigned second frame 434, such as by motion compensation circuitry 418 by realigning the second frame with the first frame if they are determined to be misaligned. As shown in block 504, the method includes using the luminance data of the realigned frame, such as by for example, the luminance based frame subtraction circuitry 420, and luminance data from the first frame to determine if an undesired flicker condition exists, such as by the flicker signal detection circuitry 422. If an undesirable flicker condition exists, the method includes generating exposure time control information 426 for the imaging sensor of the camera to reduce flicker.

Figure 6:
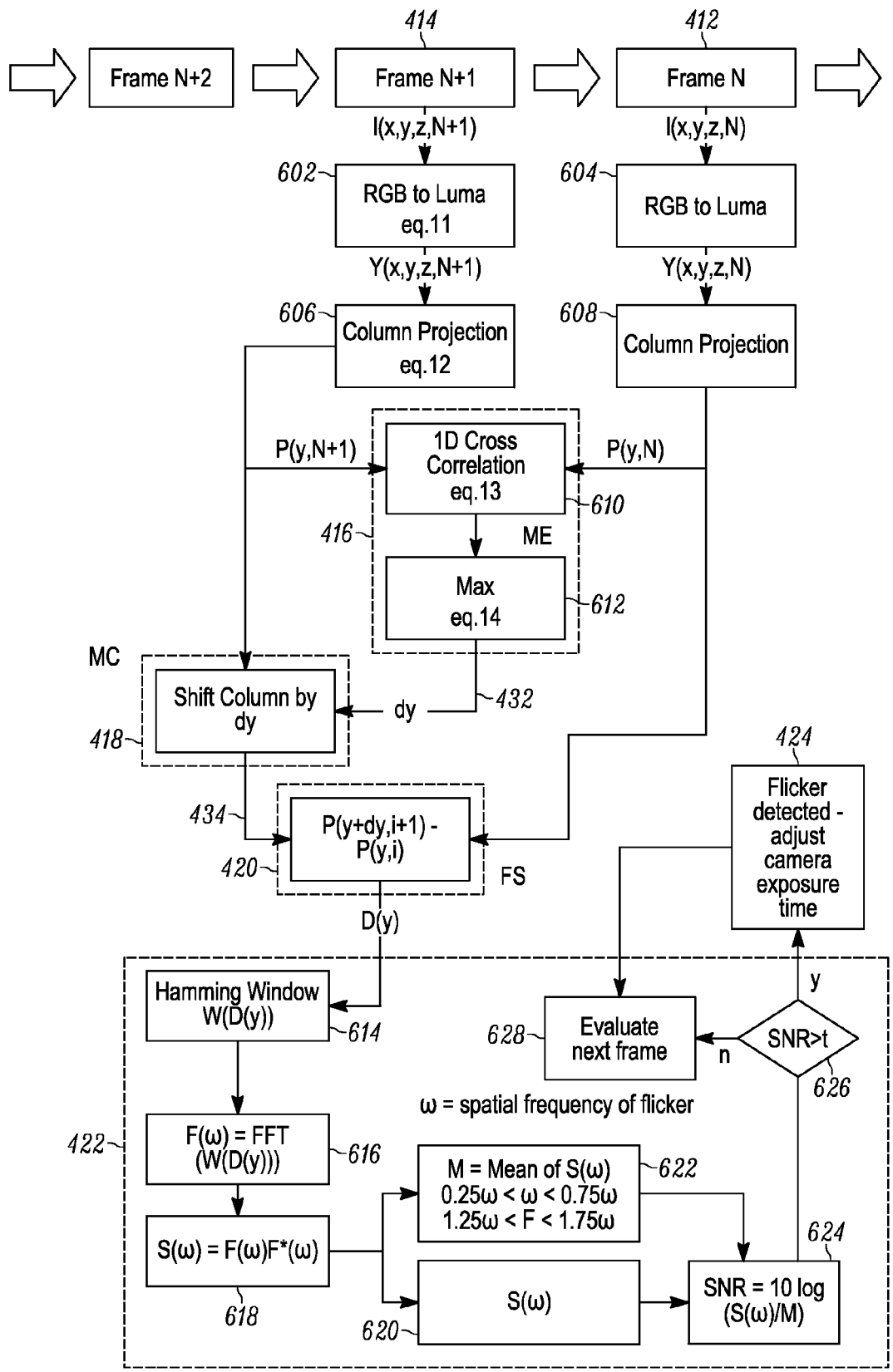
FIG. 6 is a flowchart illustrating one example of a method for detecting flicker imaging sensors that employ rolling shutters in accordance with one example set forth in the disclosure.

FIG. 6 illustrates one example of utilizing rows of pixels in the y direction only, as opposed to both the x and y direction shown in FIG. 4, to detect flicker by the circuitry 408. As shown in this example, and as further described below, the pixels from the frames 412 and 414 are converted from an RGB format to luminance values (see for example, equation 11 below) as shown by blocks 602 and 604. In this example, an entire frame is projected into a single column as shown in blocks 606 and 608 for each of the frames (see for example, equation 12 below). Motion estimation is accomplished by carrying out, for example, equations 13 and 14 below and motion compensation 418 is accomplished by doing a column shift as described below. The flicker detection circuitry 422 is shown in greater detail and is described in more detail below. It will be recognized that any suitable detection circuitry may also be used, if desired.

As further set forth below, a multi-frame approach uses alignment between frames to eliminate the signal from the scene and improve flicker detection performance.

To begin let I(x,y,d,i) be an image sequence where x and y represents the column and row indices respectively. Let d be the plane of the image and i be the frame number in the sequence. Every frame is converted from RGB to luminance as follows:

$$I_Y(x,y,i) = 0.299 \cdot I(x,y,0,i) + 0.587 \cdot I(x,y,1,i) + 0.114 \cdot I(x,y,2,i) \quad (11)$$

Figure 7:
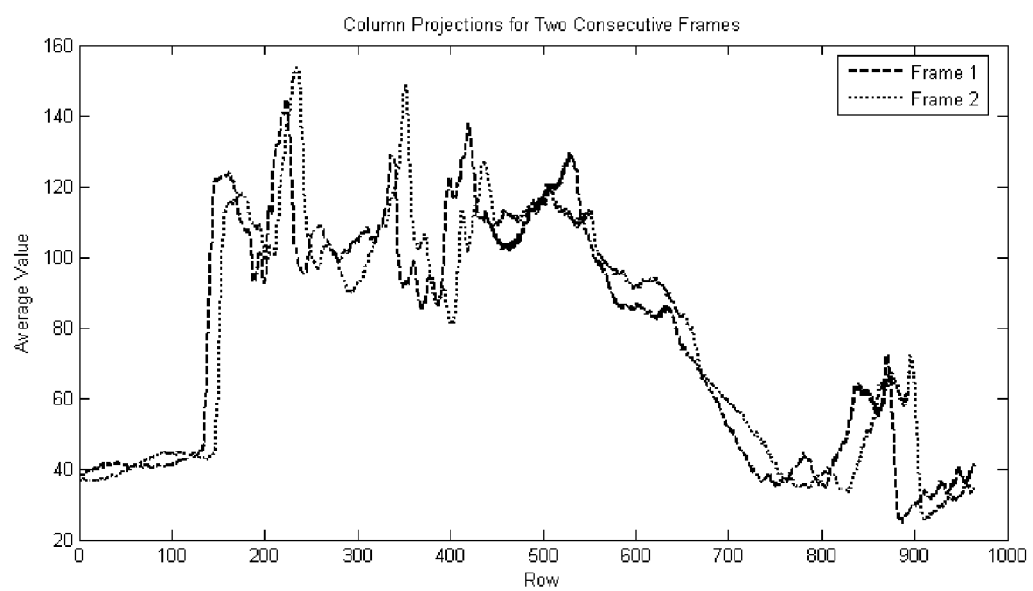
FIG. 7 is an example of column projections from two consecutive frames in accordance with one embodiment of the disclosure.

Given the strict vertical nature of the flicker signal in the image the columns in each frame are averaged to provide the following column projection:

$$P(y, i) = \sum_{s}^{s+M} I_Y(x, y, i)/M \quad (12)$$

$$s = \frac{(Y - M)}{2}$$

where M is the total number of columns to average and Y is the total number of columns in the image as given by Table 1 below resulting in less processing compared to an entire frame of information. However, it will be recognized that a column projection approach need not be employed if desired. The column projections of two consecutive frames are shown in FIG. 7. The consecutive frames were taken from a non-stationary sequence so the misalignment between these frames is visible. In order to address this misalignment the cross-correlation of consecutive projections is calculated as shown in block 610.

$$R_{P_1 P_2}(n) = \sum_{m=-Y}^{Y} P(m, i) \cdot P(n+m, i+1) \quad (13)$$

Figure 8:
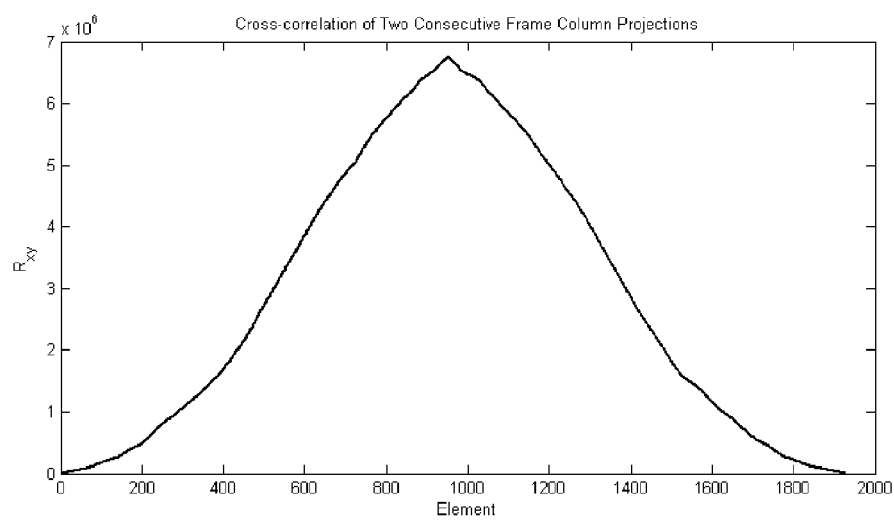
FIG. 8 is an example of a cross-correlation of two consecutive column projections in accordance with one embodiment of the disclosure.

The cross correlation of the projections in FIG. 7 is shown in FIG. 8. The index of the peak of this function is assumed to correspond to the vertical shift between frames. Block 612 shows determining this vertical shift.

$$dy = \text{Max}_n(R_{P_1 P_2}(n)) \quad (14)$$

The shift between frames is used to align the two projections before subtraction.

$$D(y) = \begin{matrix} P(y, i) - P(y+dy, i+1) & y >= dy \\ P(y, i) - P(y+(Y-dy), i+1) & y < dy \end{matrix} \quad (15)$$

The column projection difference is windowed with a hamming window W(D(y)) as shown in block 614 and the subsequent signal is taken to the frequency domain as shown in block 616 with an FFT to yield the signals Fourier representation F(w) where w is the spatial frequency. The power spectrum of the signal is obtained, as shown in block 618, as follows:

$$S(\omega) = F(\omega)F^*(\omega) \quad (16)$$

Flicker is detected by comparing the signal power in the closest bin to the flicker frequency $S(\omega_0)$, as shown in block 620, to the average signal power of surrounding frequency bins. The surrounding bins are defined by $0.25\omega_0 < w < 0.75\omega_0$ and $1.25\omega_0 < F < 1.75\omega_0$. The mean of the surrounding bins is defined as the noise level N, as shown in block 622. Therefore, the signal to noise ratio is defined in Equation 17 below and shown in block 624. The SNR herein is used to evaluate the strength of the detected flicker signal under various conditions. By applying a threshold Equation 17, it can also be used as a simple classifier. Block 626 shows classifying the signal. If the SNR exceeds the threshold, then the signal is classified as flicker as shown in block 424. If the SNR does not exceed the threshold, then the signal is not classified as a flicker as shown in block 628 and the next frame is evaluated.

$$SNR = 10\log\left(\frac{S(\omega_0)}{N}\right) \quad (17)$$

Test Results of Experimental Image Sequences

Figure 9:
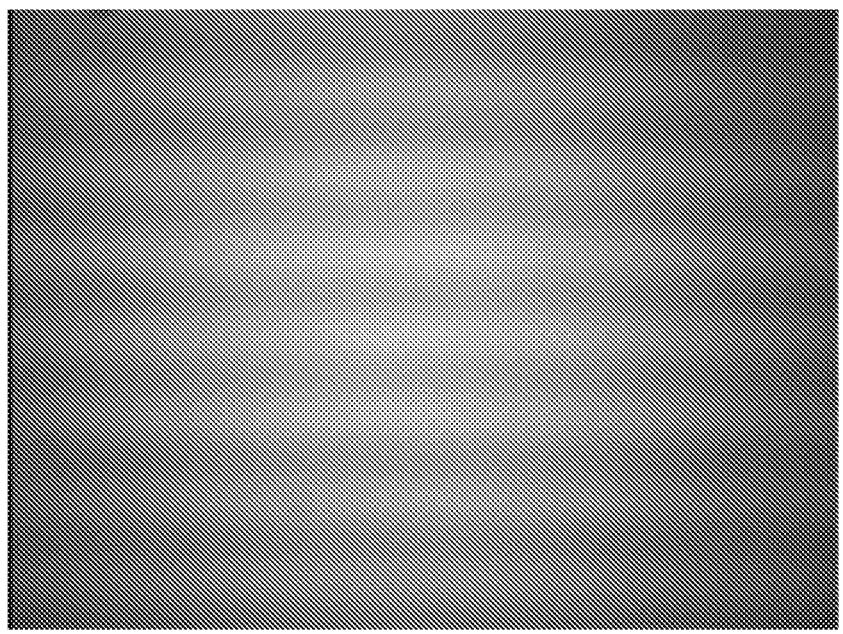
FIG. 9 is an example of a flat field scene 12.5 ms, 15 fps, showing detected flicker.
Figure 10:
FIG. 10 is an example of a complex scene 12.5 ms, 15 fps, having flicker therein.

A 5 mega pixel CMOS sensor was used with a real-time imaging system to capture sequences of images shown. Sequences are captured with two different scenes, a flat field and a complex scene as shown in FIGS. 9-10. Both scenes are illuminated at 45 degrees by two 5400K fluorescent sources powered by a 60 Hz power source. The overall light level of both scenes is 1000 lux.

The sequences are designed to reproduce realistic imaging conditions and explore the effectiveness of the process over a range of conditions. Sequences are captured at both 15 fps and 30 fps which represent practical frame rates required in a real-time imaging system. Bandwidth limitations of the camera and imaging system prevented collection of the full 5 mega pixels at these frame rates. The image dimensions captured at each frame rate are shown in Table 1 below.

Additional constraints are placed on the sensor programming after considering the properties of the proposed flicker model. As discussed previously, image flicker has maximums when $\Delta t = T/2$ in the integration time equation (Eqn. 2). As a result integration times of 12.5 ms and 29.2 ms are used to maximize the flicker magnitude of a 60 Hz source. Also, the proposed process computes a difference between consecutive frames. If the flicker is stationary then frame subtraction will remove the entire flicker signal. In order to prevent this and maximize the magnitude of the harmonic in the difference image a phase difference of T/2 is introduced between frames. With these constraints the sensor is programmed with the row delays shown in Table 1. The row delays are similar between the 15 fps and 30 fps sequences because the 30 fps sequence dimensions are ½ of the 15 fps sequence. As a result the spatial period measured in pixels is similar between the two frame rates even though at 15 fps each frame contains twice as many periods.

TABLE 1

Image sequence properties

|  | 15 fps | 30 fps |
| --- | --- | --- |
| Row Delay (us) | 64.92 | 67.98 |
| Spatial Period | 128.36 | 122.59 |
| Frequency | $8.11 \times 10^{-3}$ | $7.79 \times 10^{-3}$ |
| X: Width (pixels) | 1296 | 648 |
| Y: Height (pixels) | 965 | 427 |

Stationary Scenes

Figure 11:
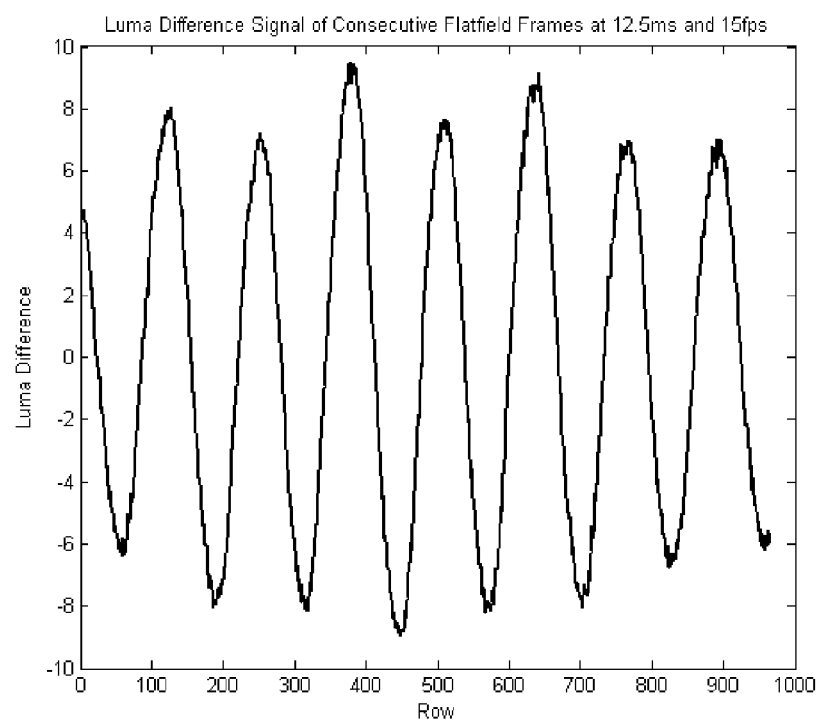
FIG. 11 is an example of a difference signal of two consecutive flat field images taken with a 12.5 ms integration time at 15 fps.
Figure 12:
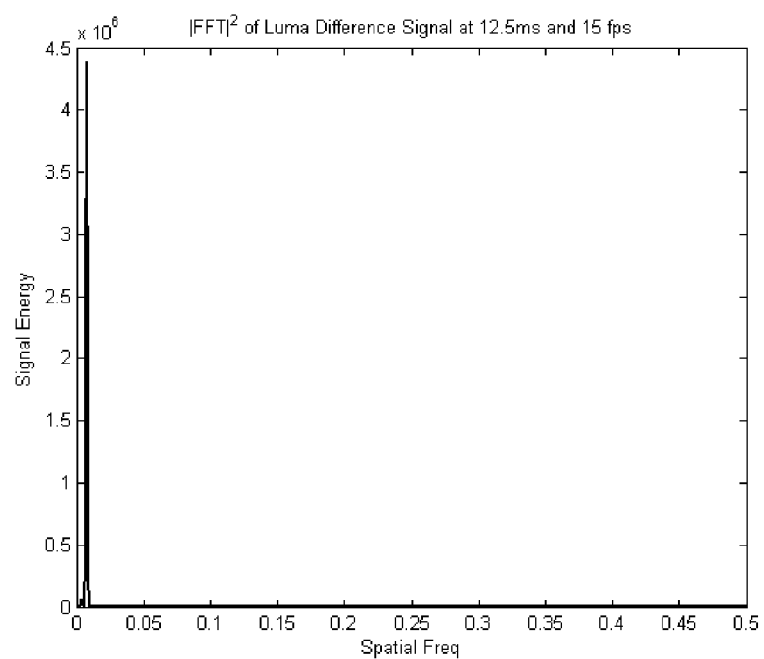
FIG. 12 is an example of a power spectrum of difference signal.

The disclosed process can be evaluated using stationary scenes in which the scene content does not move. The flat field image sequence represents the simplest case because no scene data is present to hinder the detection of the flicker signal. As a result the flicker signal is easily visible in images in FIG. 9. The process is applied to the sequence of images. For this experiment all columns in each frame are used, M=Y. FIG. 11 shows the difference signal of two frames in the sequence. The difference signal clearly shows a periodic signal. The power spectrum of the signal, shown in FIG. 12, clearly shows the flicker frequency of 0.0078.

Four sequences of images were processed and the average SNR for the sequences were recorded. The results are displayed in Table 2. The high average SNR confirms that detecting flicker in the flat field scene is trivial at both 15 and 30 fps. The SNR decreases slightly at 30 fps but generally the flicker is easily detected in all four sequences.

TABLE 2

Average SNR of flicker signal in flat field image sequences using process

| 15 fps | | 30 fps | |
| --- | --- | --- | --- |
| 12.5 ms | 29.2 ms | 12.5 ms | 29.2 ms |
| 25.13 | 25.02 | 22.01 | 22.58 |

A slightly more challenging stationary condition is evaluated with the sequences of the complex scene. The average SNR of these sequences are shown in Table 3 below. Again the SNR is quite high and the flicker can easily be detected. In both scenes there is a slight decrease in SNR as the integration time increases. This is consistent with the fact that the magnitude of the flicker decreases as the integration time increases. In addition the average SNR is substantially lower for faster frame rates. At faster frame rates the flicker has a longer wavelength and fewer periods in the image. As a result the flicker frequency is much harder to resolve in the FFT as it lies very close to the DC term.

TABLE 3

Average SNR of flicker signal in complex stationary scene image sequences

| 15 fps | | 30 fps | |
| --- | --- | --- | --- |
| 12.5 ms | 29.2 ms | 12.5 ms | 29.2 ms |
| 28.13 | 27.26 | 19.67 | 18.42 |

Figure 13:
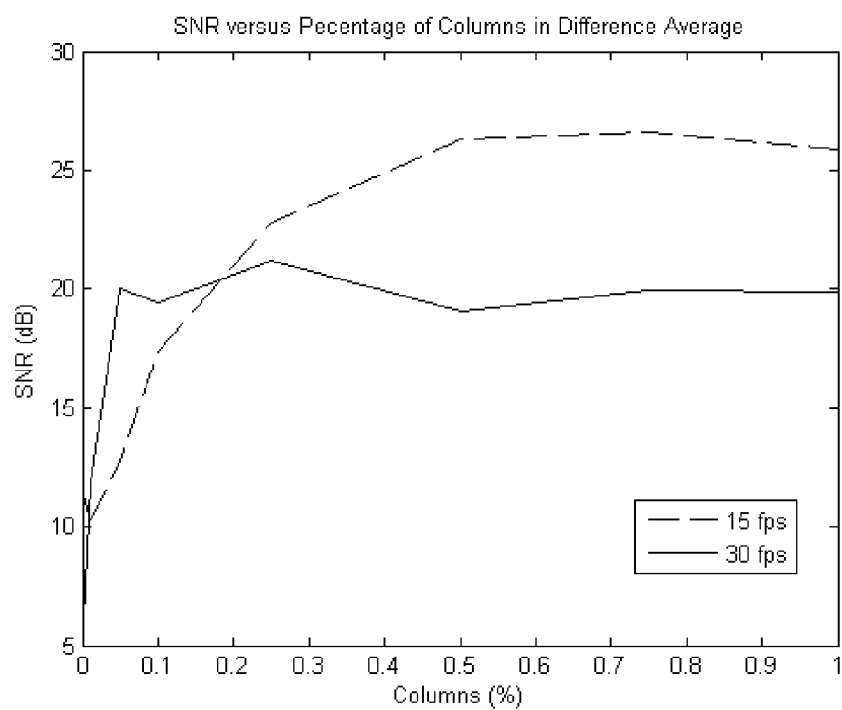
FIG. 13 is an example of an SNR versus percentage of columns used in column projection in accordance with one embodiment of the disclosure.

These results were produced using all the columns in each image resulting in a full frame subtraction. It may not always be practical to do a full frame subtraction. The effect of limiting the number of columns in the difference is shown in FIG. 13. The SNR decreases as fewer columns are included in the column projection P(y,i). Generally, running the process with 40 percent of the columns produces an acceptable SNR beyond which it produces diminishing returns. For this reason the central 40 percent of the columns in each frame are used.

Non Stationary Scenes

Non stationary scenes provide a more realistic evaluation of practical flicker detection performance. Three typical use cases may be: handshake, vertical panning and horizontal panning. In testing, the handshake sequences were processed using the process with and without the alignment step of the process. The average SNR results are summarized in Table 4 and Table 5 below. It is evident from the result in Table 4 that without alignment at 15 fps the SNR is greatly reduced. The reduction in SNR is much less severe at 30 fps. This is most likely due to the faster frame rate which prevented the scene from shifting too far between frames. At 15 fps the scene shifts much greater between frames and the SNR dropped around 16 dB from the static scene case. In Table 5, the results show a significant increase in average SNR when using the alignment process. An improvement of 5-6 dB was achieved at 15 fps where the most substantial decrease in SNR was seen.

TABLE 4

Average SNR (dB) of flicker signal in non-stationary handheld scenes without alignment

| 15 fps | | 30 fps | |
| --- | --- | --- | --- |
| 12.5 ms | 29.2 ms | 12.5 ms | 29.2 ms |
| 12.59 | 11.01 | 18.39 | 14.90 |

TABLE 5

Average SNR (dB) of flicker signal in non stationary
handheld scenes with alignment and resulting dB gain

| 15 fps | | 30 fps | |
|---|---|---|---|
| 12.5 ms | 29.2 ms | 12.5 ms | 29.2 ms |
| 18.79 | 16.20 | 19.35 | 15.52 |
| Average SNR improvement | | | |
| 6.20 | 5.19 | 0.97 | 0.62 |

Figure 14:
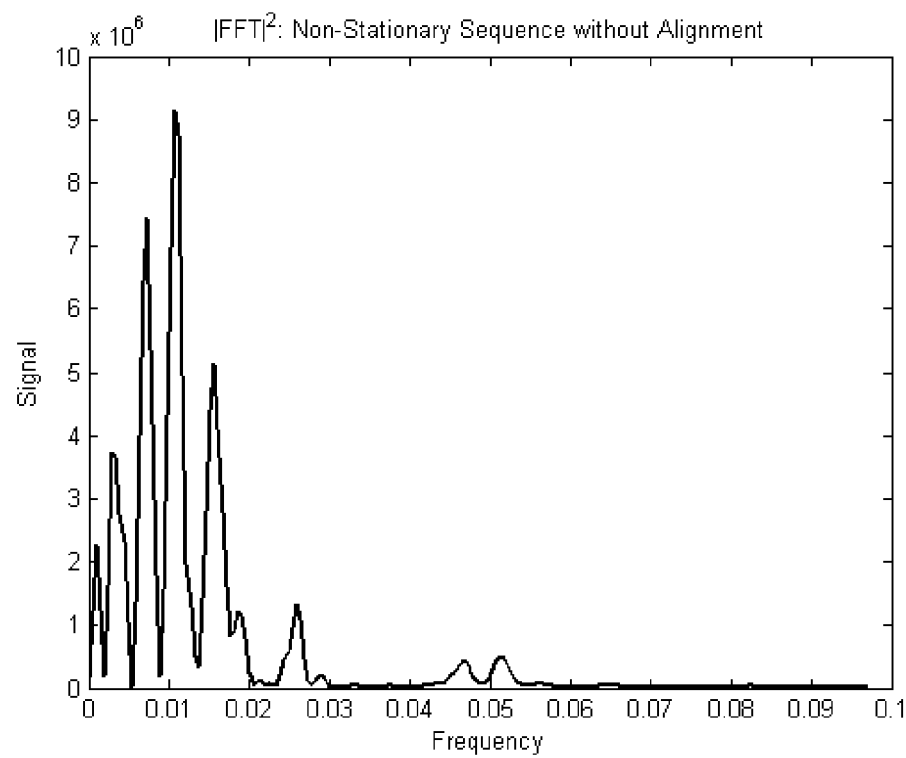
FIG. 14 is an example of a power spectrum with alignment.
Figure 15:
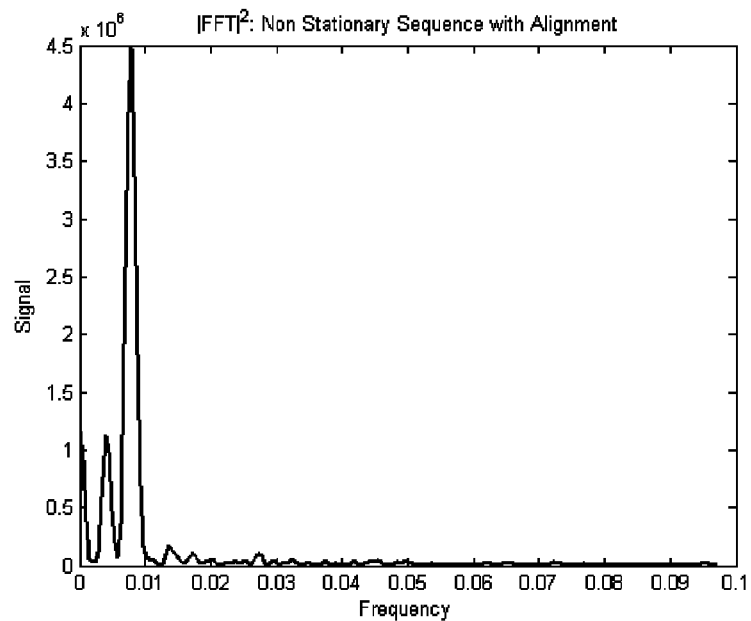
FIG. 15 is an example of a power spectrum without alignment.

The SNR results above are an average over the entire sequence. In practice though there is substantial variability in individual results from frame to frame due to random motion generated by handshake. The effect of non stationary scenes is clearly shown in the FIGS. 14 and 15. FIGS. 14 and 15 display the power spectrum, with and without alignment, of the difference between two consecutive column projections which had a larger shift of 28 pixels. FIG. 14 shows that without alignment the flicker frequency cannot be detected because a more dominant peak at 0.01 is present. FIG. 15 shows that with alignment the process can easily isolate the flicker frequency near 0.0078.

The horizontal and vertical panning sequences are also processed through the process with and without alignment. The average SNR results are displayed in Table 6 and Table 7. The horizontal panning results in Table 6 reveal that the proposed process does not improve flicker detection performance. There is a small improvement in some conditions but a closer look at the individual frames revealed vertical movement in the cases where a higher SNR was achieved. Further work could be done to extend the alignment to the vertical. Given that only 40% of the columns are being selected alignment could be obtained by selecting the aligning columns from each frame.

TABLE 6

Average SNR (dB) of flicker signal in horizontal panning scenes

| | 15 fps | | 30 fps | |
|---|---|---|---|---|
| | 12.5 ms | 29.2 ms | 12.5 ms | 29.2 ms |
| Non-Aligned | 10.60 | 3.53 | 13.29 | 4.57 |
| Aligned | 12.22 | 3.16 | 14.41 | 5.23 |

TABLE 7

Average SNR (dB) of flicker signal vertical panning scenes

| | 15 fps | | 30 fps | |
|---|---|---|---|---|
| | 12.5 ms | 29.2 ms | 12.5 ms | 29.2 ms |
| Non-Aligned | 8.74 | 4.65 | 4.07 | −1.45 |
| Aligned | 12.99 | 6.48 | 11.40 | 7.98 |

In Table 7 the results of vertical panning reveal that the alignment step offers significant improvements in all conditions. The most significant improvement in average SNR occurs at 30 fps. A closer look at the individual frame to frame results reveals the extent of this improvement. In order to reduce false positives a threshold SNR of 5 is set and used to classify detections. Applying this threshold to the 30 fps data produces the detection rates shown in Table 8. It is clear that the detection rate increases substantially with the aligned process.

Figure 16:
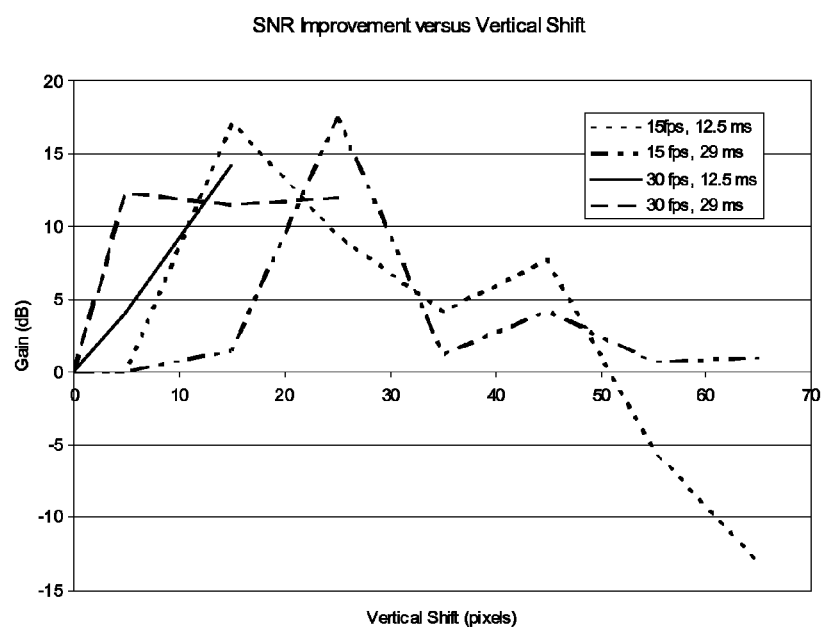
FIG. 16 is an example of an SNR improvement as a function of vertical shift in accordance with one embodiment of the disclosure.

The SNR improvement against vertical shift in FIG. 16 reveals why the performance increase is greater at 30 fps. In FIG. 16 the vertical shift as determined by the cross correlation is plotted on the horizontal axis. The increase in SNR obtained by aligning the column projections is shown in on the vertical. At 15 fps the maximal improvement occurs with a shift around 20 at which point the increase in SNR decreases until the alignment actually deteriorates the SNR around 60. Since the spatial period of the flicker at 15 fps is 128 pixels a shift of around half a period will cause the introduced phase difference between successive frames to disappear. As a result it is expected that around 60 the flicker signal will cancel out during the difference step. At 15 fps and 29 ms there is no improvement in SNR over the un-aligned process. At 15 fps and 12.5 ms the aligned process actually performs worse. This is likely due to the fact that at 12.5 ms the flicker signal magnitude is quite large and on the same order of magnitude as the scene content. Therefore an unaligned subtraction can still detect the relatively strong flicker signal. At 30 fps the most obvious difference is that there are no vertical shifts greater than 25 pixels in the sequences processed. Due to the higher frame rate the scene shifts half as much between frames. As a result the alignment shift is well below half of the 122 pixel period at 30 fps and the improvement in SNR allows for robust detection.

TABLE 8

Detection rates at 30 fps with and without alignment

| | 12 ms | 29 ms |
|---|---|---|
| Non-Aligned | 0.37 | 0.05 |
| Aligned | 0.68 | 0.74 |

In order to address non-stationary scenes, a multi-frame detection process is used with vertical alignment (and/or horizontal alignment if desired) which increases the SNR. The disclosed process offers a robust and easy to implement detection system for the shift between frames of less one half of the spatial frequency. However, shifted frames can also be used as long as correlation is consistent.

As noted above, among other advantages, the disclosed circuitry, apparatus, and method provide a multi-frame approach that uses alignment between frames to improve flicker detection performance. A multi-frame approach that uses alignment between frames is advantageous because, inter alia, it permits robust flicker detection capable of detecting flicker in both stationary and non-stationary image sequences. This provides for improved flicker detection in, for example, handshake, vertical panning, and horizontal panning imaging scenarios. Successful flicker detection is essential for reducing the undesirable effects caused by the interaction between fluorescent lighting and a CMOS imaging sensor's rolling shutter. Other advantages will be recognized by those of ordinary skill in the art.

The above detailed description of the disclosure and the examples described therein have been presented for the purposes of illustration and description only and not by limitation. It is therefore contemplated that the present disclosure cover any and all modifications, variations or equivalents that fall within the spirit and scope of the basic underlying principles disclosed above and claimed herein.

What is claimed is:

1. An apparatus comprising:
a CMOS imaging sensor with a rolling shutter configuration; and
circuitry operative to:
compare a first frame captured by the CMOS imaging sensor with a second frame captured by the CMOS imaging sensor to determine misalignment of scene content between the frames;
produce a realigned second frame by realigning the second frame with the first frame if they are determined to be misaligned;
use luminance data from the realigned second frame and luminance data from the first frame to determine if an undesired flicker condition exists and if so, adjusting an exposure time of the CMOS imaging sensor to reduce flicker; and
determine misalignment of scene content between the frames by projecting the first frame into a column to produce a first column projection, projecting the second frame into a column to produce a second column projection, and calculating a cross-correlation value between the first and second column projections.

2. The apparatus of claim 1, wherein the circuitry compares the first frame with the second frame to determine misalignment by utilizing rows of pixels in the y-direction only.

3. The apparatus of claim 1, wherein the circuitry is operative to produce the first column projection by averaging a plurality of column values associated with the first frame and produce the second column projection by averaging a plurality of column values associated with the second frame.

4. The apparatus of claim 1, wherein the circuitry is operative to determine misalignment of scene content between the frames by comparing at least one block of pixels associated with the first frame with a corresponding at least one block of pixels associated with the second frame.

5. The apparatus of claim 1, wherein the circuitry is operative to produce the realigned second frame by column-shifting the second column projection to realign with the first column projection.

6. The apparatus of claim 1, wherein the circuitry is operative to determine if an undesired flicker condition exists by comparing a signal power in a closest bin to a flicker frequency to an average signal power of surrounding frequency bins.

7. A method carried out by an electronic apparatus comprising:
comparing a first frame captured by an imaging sensor with a second frame captured by the imaging sensor to determine misalignment of scene content between the frames;
producing a realigned second frame by realigning the second frame with the first frame if they are determined to be misaligned;
using luminance data from the realigned second frame and luminance data from the first frame to determine if an undesired flicker condition exists;
if so, adjusting an exposure time of the imaging sensor to reduce flicker;
projecting the first frame into a column to produce a first column projection;
projecting the second frame into a column to produce a second column projection; and
calculating a cross-correlation value between the first and second column projections to determine misalignment of scene content between the frames.

8. The method of claim 7 further comprising:
utilizing rows of pixels in the y-direction only for comparing the first frame captured by the imaging sensor with the second frame captured by the imaging sensor to determine misalignment of scene content between the frames.

9. The method of claim 7 further comprising:
producing the first column projection by averaging a plurality of column values associated with the first frame; and
producing the second column projection by averaging a plurality of column values associated with the second frame.

10. The method of claim 7 further comprising:
comparing at least one block of pixels associated with the first frame with a corresponding at least one block of pixels associated with the second frame to determine misalignment of scene content between the frames.

11. The method of claim 7 further comprising:
column-shifting the second column projection to realign with the first column projection to produce the realigned second frame.

12. The method of claim 7 further comprising:
comparing a signal power in a closest bin to a flicker frequency to an average signal power of surrounding frequency bins; and
determining whether an undesired flicker condition exists.

13. An integrated circuit comprising:
circuitry operative to:
compare a first captured frame with a second captured frame to determine misalignment of scene content between the frames;
produce a realigned second frame by realigning the second frame with the first frame if they are determined to be misaligned;
use luminance data from the realigned second frame and luminance data from the first frame to determine if an undesired flicker condition exists and if so, generate exposure time control information for output to an imaging sensor of a camera to reduce flicker; and
determine misalignment of scene content between the frames by projecting the first captured frame into a column to produce a first column projection, projecting the second captured frame into a column to produce a second column projection, and calculating a cross-correlation value between the first and second column projections.

14. The integrated circuit of claim 13, wherein the circuitry compares the first captured frame with the second captured frame to determine misalignment by utilizing rows of pixels in the y-direction only.

15. The integrated circuit of claim 13, wherein the circuitry is operative to produce the first column projection by averaging a plurality of column values associated with the first captured frame and produce the second column projection by averaging a plurality of column values associated with the second captured frame.

16. The integrated circuit of claim 13, wherein the circuitry is operative to determine misalignment of scene content between the frames by comparing at least one block of pixels associated with the first captured frame with a corresponding at least one block of pixels associated with the second captured frame.

17. The integrated circuit of claim 13, wherein the circuitry is operative to produce the realigned second frame by column-shifting the second column projection to realign with the first column projection.

18. The integrated circuit of claim 13, wherein the circuitry is operative to determine if an undesired flicker condition exists by comparing a signal power in a closest bin to a flicker frequency to an average signal power of surrounding frequency bins.

\* \* \* \* \*